(12) United States Patent
DeRosa et al.

(10) Patent No.: US 8,537,485 B2
(45) Date of Patent: Sep. 17, 2013

(54) COMPENSATION FOR VIBRATION IN A DATA STORAGE SYSTEM

(75) Inventors: Jeffrey Vincent DeRosa, Burlington, MA (US); Bin Huang, Savage, MN (US); Chiyun Xia, Prior Lake, MN (US); John Lowell Zeller, Victoria, MN (US); Peng Yan, Eagan, MN (US)

(73) Assignee: Seagate Technology LLC, Cupertino, CA (US)

( * ) Notice: Subject to any disclaimer, the term of this patent is extended or adjusted under 35 U.S.C. 154(b) by 278 days.

(21) Appl. No.: 13/173,841

(22) Filed: Jun. 30, 2011

(65) Prior Publication Data

US 2013/0003219 A1  Jan. 3, 2013

(51) Int. Cl.
*G11B 5/02* (2006.01)
*G11B 5/09* (2006.01)

(52) U.S. Cl.
USPC ......... 360/55; 360/75; 360/77.06; 360/78.01; 369/44.32

(58) Field of Classification Search
None
See application file for complete search history.

(56) References Cited

U.S. PATENT DOCUMENTS

| | | | |
|---|---|---|---|
| 5,235,472 | A | 8/1993 | Smith |
| 6,122,139 | A | 9/2000 | Sri-Jayantha et al. |
| 6,400,107 | B1 | 6/2002 | Nakatani et al. |
| 6,580,579 | B1 | 6/2003 | Hsin et al. |
| 6,738,214 | B2 | 5/2004 | Ishiyama et al. |
| 6,963,463 | B2 | 11/2005 | Sri-Jayantha et al. |
| 2010/0067357 | A1 | 3/2010 | Huang et al. |

*Primary Examiner* — Muhammad N Edun
(74) *Attorney, Agent, or Firm* — Braden Katterhenrich

(57) ABSTRACT

A plurality of sensors are used to sense disturbances in a data storage system. An adaptive gain component is associated with each of the sensors and provides a gain for each of the sensor signals. The gain of each sensor signal is adapted, individually, based on a correlation of each given sensor signal to the position error signal. This adaptation produces a position correction signal. The position correction signal is applied to a position signal that is used to position the reading and writing components and the storage medium relative to one another. This compensates for both rotary and linear vibration disturbances at the same time.

16 Claims, 3 Drawing Sheets

COMPENSATION FOR VIBRATION IN A DATA STORAGE SYSTEM

BACKGROUND

Data storage systems often include reading and writing components that read data from, and write data to, a storage medium. In some storage systems, the reading and writing components and the storage medium move relative to one another. In those systems, the relative position of the reading and writing components, relative to the storage medium, is sensed and used to determine whether the reading and writing components are at a desired position relative to the storage medium, in order to accurately read and write desired data.

Data storage systems are also often subjected to significant amounts of vibration, acceleration, or other disturbances. These disturbances can rotate a data storage system about its center in an x-y plane, and this is referred to as rotary vibration. In addition, the disturbances can shift the data storage system linearly along the x or y axis, respectively, and this is referred to as linear vibration.

In order to sense various disturbances that can occur in data storage systems, some data storage systems have included two acceleration sensors (or accelerometers) that are mounted on the corners of a printed circuit board assembly that is used in controlling the data storage system. Signals generated by the two accelerometers can be subtracted from one another in order to measure rotary vibration disturbances in the data storage system. However, in order for this to be done, it is important that the gain of each sensor is substantially equal to the gain of the other sensor, and the axis of rotation of the structure on which the sensors are mounted is centered between the two sensors. In addition, it is important that the sensing axes of the two sensors be closely aligned to one another, in order to obtain an accurate signal reflecting disturbances on the data storage system. Accurately sensing and compensating for disturbances can be difficult.

Aspects of the present disclosure address these and/or other problems.

SUMMARY

In some current data storage systems, a feedback control loop relies on reading the position of the reading and writing components relative to the storage medium. However, this type of control loop has not been fast enough to correct for off-track movements that are generated from linear or rotary vibrations because the control loop operates at a relatively low bandwidth. Thus, some data storage systems use a rotational vibration feed forward (RVFF) algorithm to inject current into the control system to compensate for the position errors caused by rotational vibration. This type of system can be helpful in correcting for rotational vibration disturbance. However, it has only accounted for the correlation between the rotational vibration signal (generated by subtracting the two acceleration sensor signals) and a position error of the reading components relative to the storage medium. Such systems have largely ignored the linear vibration signal, entirely. It has been found that there is an impact on the performance of some data storage systems when the linear vibration disturbance becomes non-negligible.

In accordance with one aspect, a plurality of sensors are used to sense disturbances in a data storage system. An adaptive gain component is associated with each of the sensors and provides a gain for each of the sensor signals. The gain of each sensor signal is adapted, individually, based on a correlation of each given sensor signal to the position error signal. This adaptation produces a position correction signal. The position correction signal is applied to a position signal that is used to position the reading and writing components and the storage medium relative to one another. This compensates for both rotary and linear vibration disturbances at the same time. It accommodates for any gain mismatch between the sensors and also greatly reduces, if not eliminates, the need to mount the sensors accurately about the axis of rotation of the data storage system.

Other features and benefits that characterize embodiments of the present disclosure will be apparent upon reading the following detailed description and review of the associated drawings.

DETAILED DESCRIPTION OF ILLUSTRATIVE EMBODIMENTS

The description corresponding to FIGS. 1-3 below illustrates how a pair of sensors can be used to sense disturbances in a data storage system and how the gain of the signals for those sensors can be individually compensated so the system automatically corrects for both rotary vibration and linear vibration disturbances. The signals from the two sensors are treated as independent system inputs. Gain is individually adjusted based on a correlation between the individual sensor signals and a position error signal that reflects an error in position between reading components and a data storage medium. However, before describing these embodiments in detail, an example of a data storage device in which these embodiments can be used will be discussed.

Figure 1:
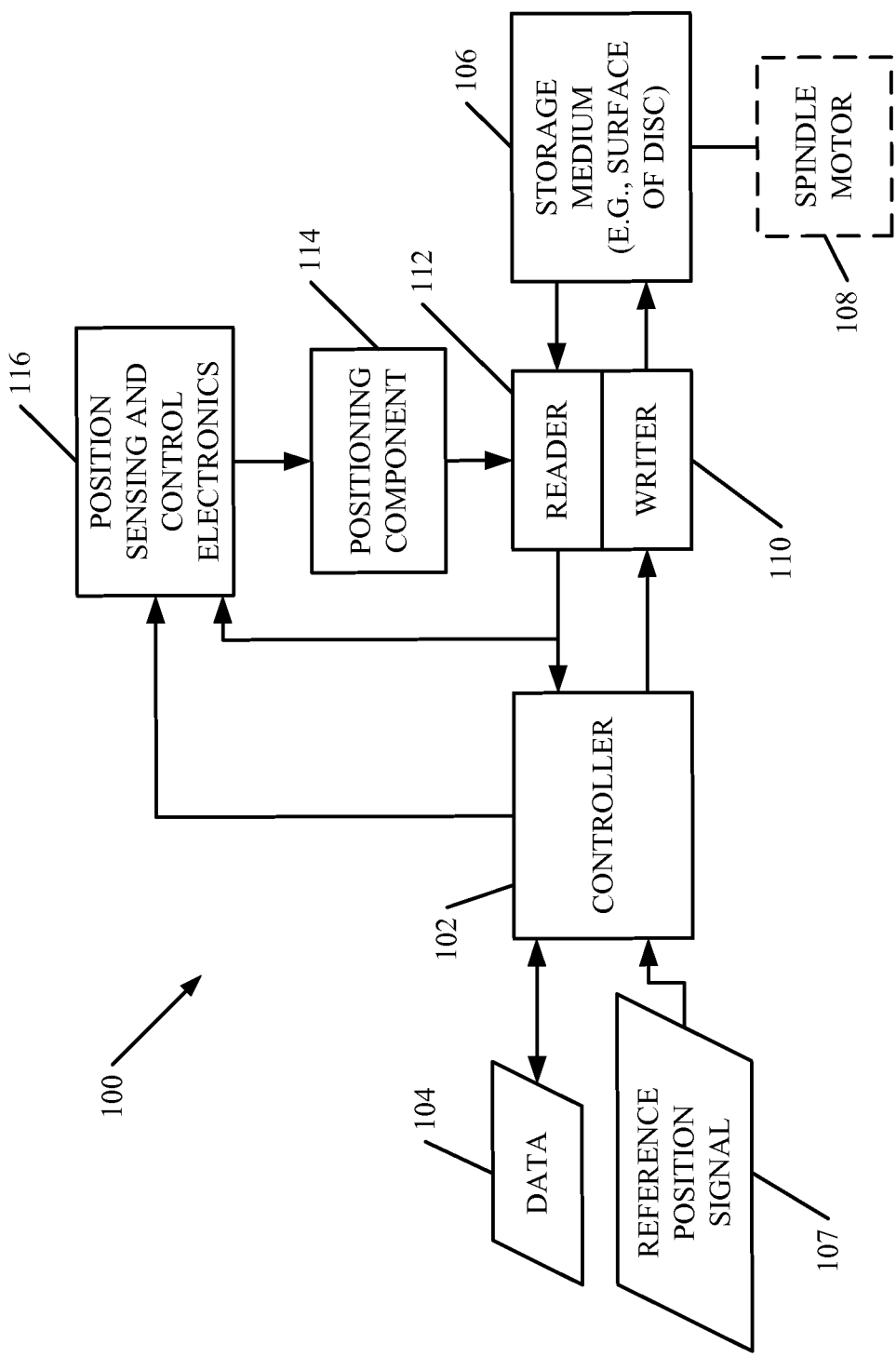
FIG. 1 is a simplified block diagram illustrating some components of a data storage system.

FIG. 1 is a simplified block diagram illustrating one embodiment of a data storage system 100. FIG. 1 illustratively shows that system 100 includes a controller (such as a computer processor) 102 that receives data 104 that is to be written to a storage medium 106. Data 104 is written to storage medium 106 by a data accessing component such as writing component (or writer) 110. Similarly, data can be read from storage medium 106 using a data accessing component such as reading component (or reader) 112. In one embodiment, data storage system 100 is a disc drive and the storage medium is the surface of a disc in the disc drive. In that embodiment, spindle motor 108 is used to rotate the discs. Spindle motor 108 is shown in phantom because it is only used in the embodiment in which system 100 is a disc drive. However, a disc drive is but one storage medium, and others could be used as well.

In the embodiment discussed herein, storage system 100 is a type of system in which reader/writer 112, 110 and storage medium 106 move relative to one another. Therefore, data storage system 100 also includes a positioning component (or plant) 114 that, in the embodiment shown, positions reader/writer (or plant components) 112, 110 relative to storage medium (or plant component) 106.

Similarly, system 100 includes position sensing and control electronics 116. In the exemplary embodiment, controller 102 and position sensing and control electronics 116 position reader/writer 112, 110 relative to medium 106 by using reader 112 to read position information from storage medium 106 that indicates a relative position of reader 112 relative to storage medium 106. The position information is provided to controller 102 and position sensing and control electronics 116. Controller 102 also receives a reference position signal 107 which indicates a desired position of reader/writer 112, 110 relative to storage medium 106. Based on the position signal read back from the storage medium 106, and the reference position signal 107, controller 102 provides a position signal to position sensing and control electronics 116 in order to control the position of reader/writer 112, 110 relative to storage medium 106, using positioning component 114. In the illustrative embodiment in which data storage system 100 is a disc drive, and storage medium 106 includes a plurality of discs that are rotated by spindle motor 108, reader/writer 112, 110 are positioned relative to the discs in storage medium 106 by a voice coil motor which comprises positioning component 114. Of course, a disc drive is but one exemplary embodiment of a data storage system, and other embodiments can be used as well.

It should be noted that separate controllers can be used for reading and writing data 104 relative to storage medium 106, and for controlling the position of reader 112 and writer 110 relative to storage medium 106. In the embodiment shown in FIG. 1, both control functions are shown as being controlled by controller 102. However, controller 102 could be two or more separate controllers, each having their own timing and memory components, or both control functions could be combined into a single controller. Also, the position control electronics 116 can be incorporated into controller 102 as well, or they can be implemented in a separate controller, or in more discrete electronic components. The illustration shown in FIG. 1 is for example only.

As discussed above, data storage system 100 can be subjected to either internal or external forces which create linear or rotary movement or vibration, or other physical disturbances of data storage system 100. This can cause reader/writer 112, 110 to be jolted, or otherwise moved, out of its desired position relative to storage medium 106. In the embodiment where storage medium 106 comprises a disc, the imparted disturbances can cause reader 112 or writer 110 to exhibit off-track errors in which the reader 112 or writer 110 is not positioned over a desired track, but is instead off track by a position error amount. Thus, in the embodiment discussed herein, position sensing and control electronics 116 include disturbance sensors (such as vibration sensors) which sense the forces imparted to disc drive 100 that can cause position errors. Sensed disturbances are then compensated for when controlling positioning component 114 so that reader 112 and writer 110 are accurately positioned relative to storage medium 106.

Figure 2:
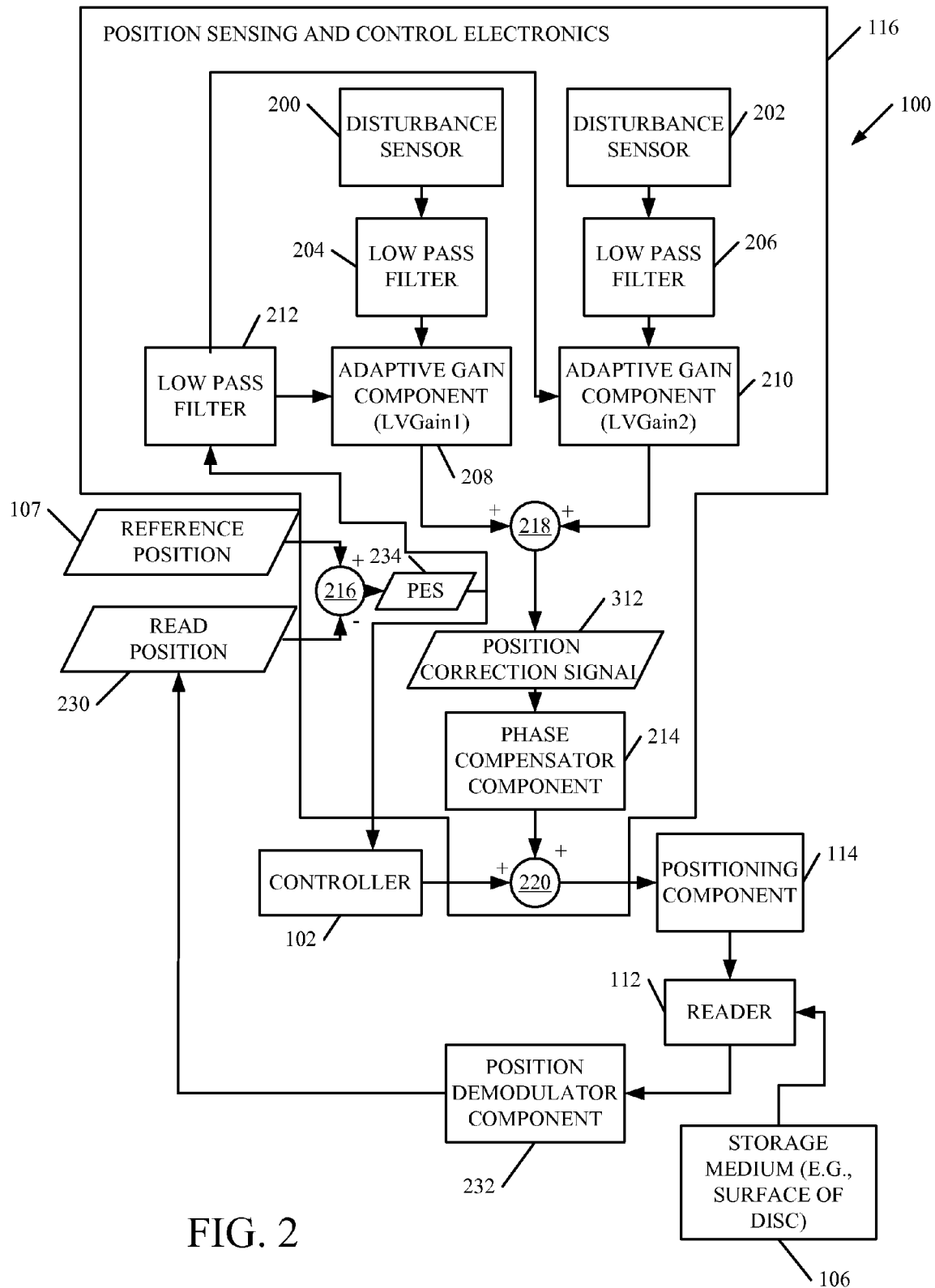
FIG. 2 is a more detailed block diagram of position sensing and control electronics shown in FIG. 1.

FIG. 2 is a more detailed block diagram of a portion of disc drive 100. FIG. 2 shows position sensing and control electronics 116 in greater detail. In the embodiment shown in FIG. 2, position sensing and control electronics 116 includes two disturbance sensors 200 and 202. Position sensing and control electronics 116 also, in one embodiment, includes low pass filter 212, phase compensator component 214, position demodulator component 232 and a plurality of signal combination nodes 216, 218 and 220.

Each disturbance sensor 200, 202 has a corresponding low pass filter 204 and 206 as well as an adaptive gain component 208 and 210, respectively. In one embodiment, disturbance sensors 200 and 202 are accelerometers that are mounted on a printed circuit board assembly that contains position sensing and control electronics 116. The accelerometers each provide a signal indicative of acceleration along one or more sensing axes. In one embodiment, the two sensors 200 and 202 are mounted on opposite corners of the printed circuit board assembly, although other mounting configurations can be used as well.

Figure 3:
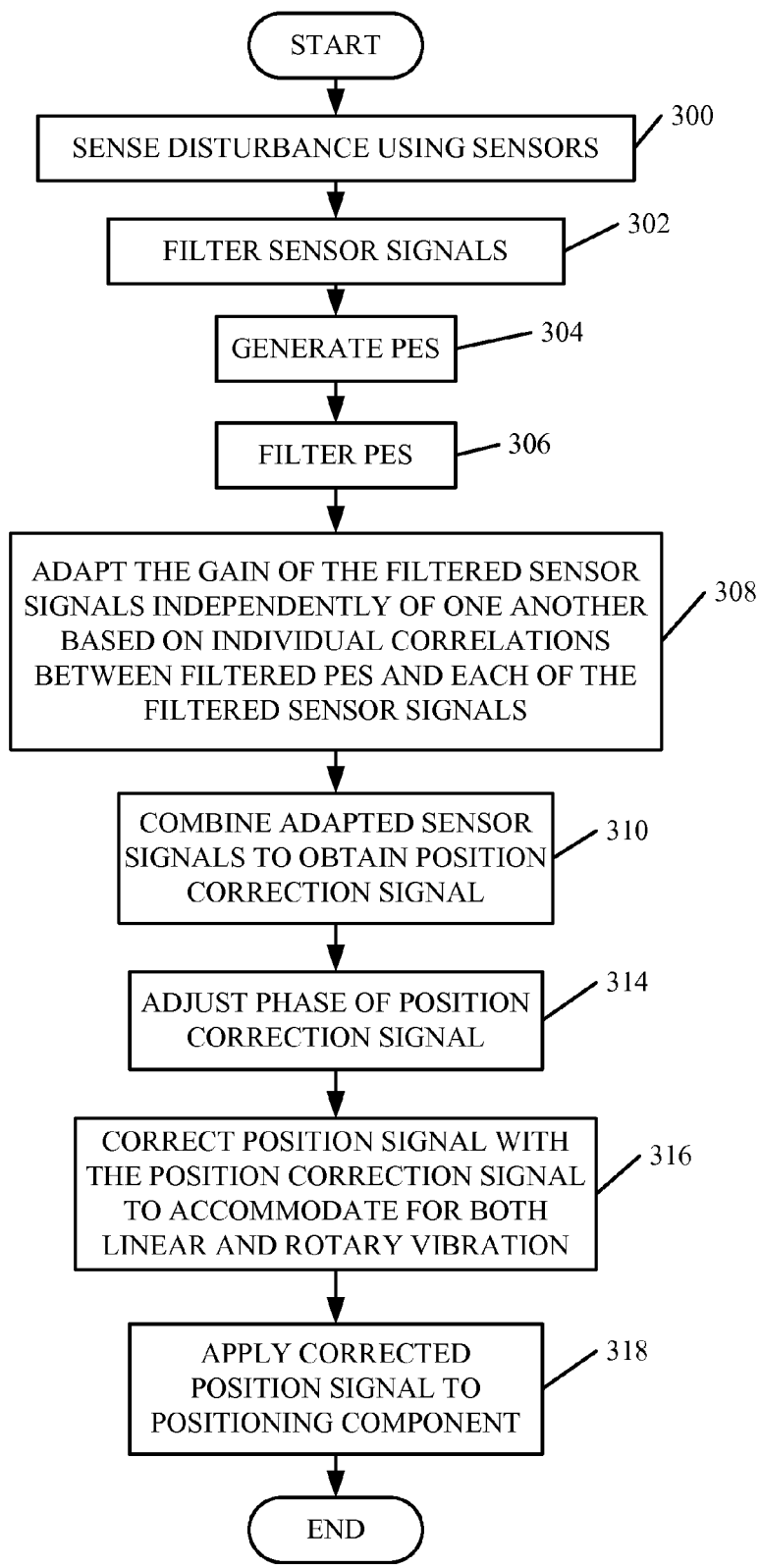
FIG. 3 is a flow diagram illustrating one embodiment of the operation of the system shown in FIG. 2.

FIG. 3 is a flow diagram showing one embodiment of the operation of data storage system 100 shown in FIG. 2, in compensating for sensed disturbances. First, disturbance sensors 200 and 202 sense a disturbance that is imparted to data storage system 100. This is indicated by block 300 in FIG. 3. In one embodiment, as discussed above, disturbance sensors 200 and 202 are accelerometers that provide, at their outputs, acceleration signals indicative of accelerations of disc drive 100 along the sensing axes of sensors 200 and 202. Of course, other sensors could be used as well.

In any case, sensor signals provided by sensors 200 and 202 are filtered using low pass filters 204 and 206. This is indicated by block 302 in FIG. 3. Low pass filters 204 and 206 filter out high frequency components of the sensor signals. In one embodiment, low pass filters 204 and 206 are second order filters with 1.5 KHz bandwidth. Of course, this is exemplary only and the actual implementation of filters 204 and 206 will change with the application, and can be determined empirically or otherwise.

While the disturbances are being sensed, data storage system 102 generates a position error signal by subtracting the position signal 230, read from storage medium 106 by reader 112, from the reference position signal 107, which indicates a desired position of reader 112 relative to storage medium 106. In one embodiment, the signal generated by reader 112 is provided to position demodulator component 232 which demodulates the signal to provide the position signal 230. The amount by which the position signal 230 differs from the reference position 107 is identified as position error signal (or PES) 234. Position error signal 234 is provided to controller 102 and to low pass filter 212. Generating the position error signal is indicated by block 304 in FIG. 3.

Low pass filter 212 filters the position error signal to filter out high frequency components of the position error signal. Again, in one illustrative embodiment, low pass filter 212 is a second order filter with a 1.5 KHz bandwidth. Of course, other implementations for low pass filter 212 can be used as well. Filtering position error signal 234 is indicated by block 306 in FIG. 3.

The output of low pass filter 212 (the filtered PES) is provided to adaptive gain component 208 and adaptive gain component 210. Adaptive gain components 208 and 210 use the filtered PES output by low pass filter 212 to adapt the gain of the filtered sensor signals independently of one another based on individual correlations between the filtered position error signal and each of the filtered sensor signals, respectively. In one embodiment, adapting the gain of the two sensor signals based on a correlation of the filtered PES and the filtered sensor signals is done according to the following gain update equations:

$$LVGain1(k+1) = LVGain1(k) + StepSizeLV1 \qquad \text{Eq. 1}$$

$$LVGain2(k+1) = LVGain2(k) + StepSizeLV2 \qquad \text{Eq. 2}$$

where $$StepSizeLV1 = adapGain*PESLowPass(k)*LVSensor1LowPass(k) \qquad \text{Eq. 3}$$

$$StepSizeLV2 = adapGain*PESLowPass(k)*LVSensor2LowPass(k) \qquad \text{Eq. 4}$$

The term "adapGain" is the adaptation gain, PESLowPass (k) is the output of low pass filter 212, LVSensor1LowPass(k)

is the output of low pass filter 204 at time k, and LVSensor2LowPass(k) is the output of low pass filter 206 at time k.

In the illustrative embodiment, adaptive gain components 208 and 210 are adaptive scalars, LVGain1 and LVGain2, that are updated using Equations 1-4 above. The correlation of the PES low pass filtered signal output by low pass filter 212 and low pass filtered sensor signals output by filters 204 and 206 are used to adaptively adjust the two gains LVGain1 and LVGain2.

The adaptation gain "adapGain" is, in one embodiment, tuned to provide a fast adaptation response and maintain system stability. This tuning can be carried out using any desired process, or it can be set empirically, until the desired adaptation response is achieved. Also, in one embodiment, the two step sizes, StepSizeLV1 and StepSizeLV2 are given an upper bound for stability. When one or both of the two step sizes exceed the upper bound value, then the larger step size is illustratively set to the upper bound value while the smaller step size is relatively scaled down from the upper bound value. This will ensure that the adaptation and/or correction to the position signal is in the right direction. The bound value can be set as desired or determined empirically or otherwise. Adapting the gain of the filtered sensor signals is indicated by block 308 in FIG. 3.

Once the gain of the sensor signals has been adapted, the output of components 208 and 210 are then combined at node 218 to obtain a position correction signal 312. In one embodiment, node 218 is a summing node and the two signals are added together. Combining the adapted sensor signals to obtain the position correction signal 312 is indicated by block 310 in FIG. 3. The position correction signal illustrates a magnitude and direction by which the position of the reader 112 is to be corrected.

It will be noted that there can be some phase loss in generating a position correction signal 312 due to processing the signals used to obtain signal 312. Therefore, phase compensator 214 is used to compensate for phase losses incurred during processing, or for other reasons. In one embodiment, phase compensator component 214 is a lead/lag compensator that adds or subtracts phase to position correction signal 312 so that it is applied at the right point in time to the position output by controller 102. In one exemplary embodiment, the lead/lag compensator is a second order filter with two poles and two zeros. It creates phase correction (such as phase lead) in a range of frequencies from approximately 100 Hz to approximately 1500 Hz to compensate for delay in the frequency range of interest. Of course, phase correction can be for any range of frequencies, not just 100 to 1500 Hz, which is given by way of example only. Adjusting phase of the position correction signal is indicated by block 314 in FIG. 3.

The output of phase compensator component 214 is provided to combining node 220 where it is combined with the position signal output by controller 102. The position signal is corrected by the phase compensated position correction signal 312 at node 220. It will be noted that the phase compensated position correction signal not only compensates for rotary vibration (or disturbances) but linear vibration (or disturbances) as well. Correcting the position signal with the position correction signal is indicated by block 316 in FIG. 3.

Finally, the corrected position signal output by node 220 is applied to positioning component 114 to more accurately position reader 112. This is indicated by block 318 in FIG. 3.

It can thus be seen that the positioning system discussed above treats the signal from each of the disturbance sensors 200, 202 as an independent system input and uses the correlation between those inputs and the position error signal to adaptively adjust the gain for those sensor signals. This approach not only substantially simultaneously, corrects both rotational vibration and linear vibration, but it also corrects for any gain mismatch between the sensors 200, 202 and thus substantially eliminates the need to sort the sensors in order to match gains in sensor pairs. It also substantially eliminates the need to have the sensors mounted evenly about the center of rotation of a printed circuit board assembly, with their sensing axes closely aligned, since the adaptation algorithm naturally corrects for all of this.

In an embodiment where data storage system 100 is a disc drive, the positioning system shown in FIG. 2 adapts LVGain1 and LVGain2 in components 208 and 210 during track following. Controller 102 can illustratively lock the two gains during seek settle periods if desired, so as to reduce the likelihood of unwanted oscillation.

It is to be understood that even though numerous characteristics and advantages of various embodiments have been set forth in the foregoing description, together with details of the structure and function of various embodiments, this disclosure is illustrative only, and changes may be made in detail, especially in matters of structure and arrangement of parts within the principle disclosure to the full extent indicated by the broad general meaning of the terms in which the appended claims are expressed. For example, the particular elements, or the functions performing those elements, may vary and be grouped together or further separated, depending on the particular application of the storage system, while maintaining substantially the same functionality without departing from the scope of the disclosure. In addition, although one embodiment described herein is directed to a disc drive system, it will be appreciated by those skilled in the art that the teachings can be applied to any data storage system, where an accessing component and the storage medium move relative to one another, without departing from the scope of the disclosure.

What is claimed is:

1. A control system, comprising:
   first and second disturbance sensors configured to provide first and second sensor signals, respectively, indicative of sensed disturbances to the control system; and
   a position control component configured to:
      correlate the first sensor signal and a position error signal to generate a first correlated sensor signal,
      correlate the second sensor signal and the position error signal to generate a second correlated sensor signal,
      add together by summing the first and second correlated sensor signals to generate a position error correction signal, and
      adjust a position signal with the position error correction signal, the first and second correlations being calculated separately from one another.

2. The control system of claim 1, wherein the position error signal is indicative of a difference between a desired position of a data accessing component relative to a data storage medium and an actual position of the data accessing component.

3. The control system of claim 2, wherein the data storage medium comprises a surface of a disc, the control system further comprising:
   a voice coil motor responsive to the position signal to position the data accessing component.

4. The control system of claim 1 wherein the position control component adjusts the position signal to compensate for rotary vibration disturbances, in response to the first correlation and the second correlation.

5. The control system of claim 4 wherein the position control component compensates for linear vibration disturbances and rotary vibration disturbances simultaneously.

6. The control system of claim 1 wherein the position control component comprises:
- a first adaptive gain component adapting gain of the first sensor signal based on the first correlation; and
- a second adaptive gain component adapting gain of the second sensor signal based on the second correlation.

7. The control system of claim 6 wherein the position control component comprises:
- a phase compensator component adjusting phase of the position error correction signal to accommodate for phase differences between the position signal and the position error correction signal; and
- a low pass filter filtering the position error signal to obtain a filtered position error signal, the first and second adaptive gain components adapting gain of the first and second sensor signals, respectively, based on the filtered position error signal.

8. A method, comprising:
- adapting a gain of a first sensor signal based on a correlation of the first sensor signal with a position error signal, the first sensor signal indicative of a sensed disturbance in a data storage system with a first sensor;
- adapting a gain of a second sensor signal based on a correlation of the second sensor signal with the position error signal, the second sensor signal indicative of the sensed disturbance with a second sensor;
- adding by summing together the adapted first sensor signal with the adapted second sensor signal to create a combined signal;
- generating a correction signal in response to the combined signal; and
- positioning a data accessing component relative to a storage medium in response to the correction signal to accommodate for a linear component of the sensed disturbance.

9. The method of claim 8, further comprising:
- positioning the data accessing component in response to the correction signal to accommodate for both a linear component and rotational component of the sensed disturbance.

10. The method of claim 8 wherein generating a correction signal comprises:
- phase compensating the combined signal for phase differences between the combined signal and a position signal indicative of a desired position of the data accessing component and the storage medium relative to one another.

11. The method of claim 8 wherein adapting a gain of the first sensor signal comprises placing an upper bound on a step change of the adapted first sensor signal.

12. The method of claim 11 wherein adapting a gain of the second sensor signal comprises placing the upper bound on a step change of the adapted second sensor signal.

13. The method of claim 12 wherein, when a step change of either the adapted first sensor signal or the adapted second sensor signal is scaled to be set to the upper bound, a step change in the other of the adapted first sensor signal and the adapted second sensor signal is correspondingly scaled to a value less than the upper bound.

14. A data storage device, comprising:
- first and second sensors configured to generate first and second sensor signals, respectively, indicative of disturbances imparted to the data storage device;
- a voice coil motor for positioning a data accessing component relative to a data storage medium; and
- a controller configured to:
  - adapt a gain of the first sensor signal based on a correlation of the first sensor signal with a position error signal,
  - adapt a gain of the second sensor signal based on a correlation of the second sensor signal with the position error signal,
  - add by summing together the adapted first sensor signal with the adapted second sensor signal to create a combined signal,
  - generate a correction signal in response to the combined signal, and
  - position the data accessing component relative to the storage medium in response to the correction signal.

15. The data storage device of claim 14 wherein the controller simultaneously compensate for:
- rotary vibration, mismatch in gain between the first and second sensors, and misalignment of sensing axes of the first and second sensors.

16. The data storage device of claim 14, wherein the first and second sensors are positioned on a printed circuit board assembly.

* * * * *